United States Patent
Itoh

(10) Patent No.: US 7,586,737 B2
(45) Date of Patent: Sep. 8, 2009

(54) ELECTRONIC COMPONENT AND LEAD UNIT THEREFOR

(75) Inventor: Masayuki Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1 day.

(21) Appl. No.: 12/102,280

(22) Filed: Apr. 14, 2008

(65) Prior Publication Data

US 2008/0190647 A1    Aug. 14, 2008

Related U.S. Application Data

(63) Continuation of application No. PCT/JP2005/018931, filed on Oct. 14, 2005.

(51) Int. Cl.
    *H01G 9/00* (2006.01)
(52) U.S. Cl. .................. 361/523; 361/516; 361/519; 361/525; 361/528; 361/536
(58) Field of Classification Search ......... 361/517–519, 361/516, 523–525, 528–541, 303–305
    See application file for complete search history.

(56) References Cited

U.S. PATENT DOCUMENTS

| | | | | |
|---|---|---|---|---|
| 5,870,275 | A * | 2/1999 | Shiono et al. | 361/504 |
| 6,052,273 | A * | 4/2000 | Inoue et al. | 361/523 |
| 6,128,179 | A * | 10/2000 | Morokuma | 361/517 |
| 6,442,016 | B2 * | 8/2002 | Fukuyama et al. | 361/523 |
| 6,507,481 | B2 * | 1/2003 | Minato et al. | 361/517 |
| 6,962,612 | B1 * | 11/2005 | Saito et al. | 29/25.03 |
| 7,095,605 | B2 * | 8/2006 | Suenaga et al. | 361/523 |

FOREIGN PATENT DOCUMENTS

| | | |
|---|---|---|
| JP | 49-47844 U | 4/1974 |
| JP | 49-82237 U | 7/1974 |
| JP | 1-169916 A | 7/1989 |
| JP | 4-123526 U | 11/1992 |
| JP | 8-148384 A | 6/1996 |
| JP | 2000-277383 A | 10/2000 |

OTHER PUBLICATIONS

International Search Report of PCT/JP2005/018931, date of mailing Jan. 17, 2006.
International Preliminary Report on Patentability of PCT/JP2005/018931, date of issue Apr. 15, 2008.

* cited by examiner

*Primary Examiner*—Nguyen T Ha
(74) *Attorney, Agent, or Firm*—Westerman, Hattori, Daniels & Adrian, LLP.

(57) ABSTRACT

An electronic component has a casing. An electrically-conductive body enclosed in the casing. The inner end of a lead is welded to the electrically-conductive body. The outer end of the lead projects outward out of the casing through a through hole formed in the casing. An enlarged portion is formed in the lead at a position between the inner end and the outer end. The enlarged portion is set in the through hole to close the through hole. Even if whiskers are generated at a position between the electrically-conductive body and the lead based on stress generated during a welding process, the whiskers are received on the enlarged portion in the through hole. No whisker falls out of the casing through the through hole.

3 Claims, 6 Drawing Sheets

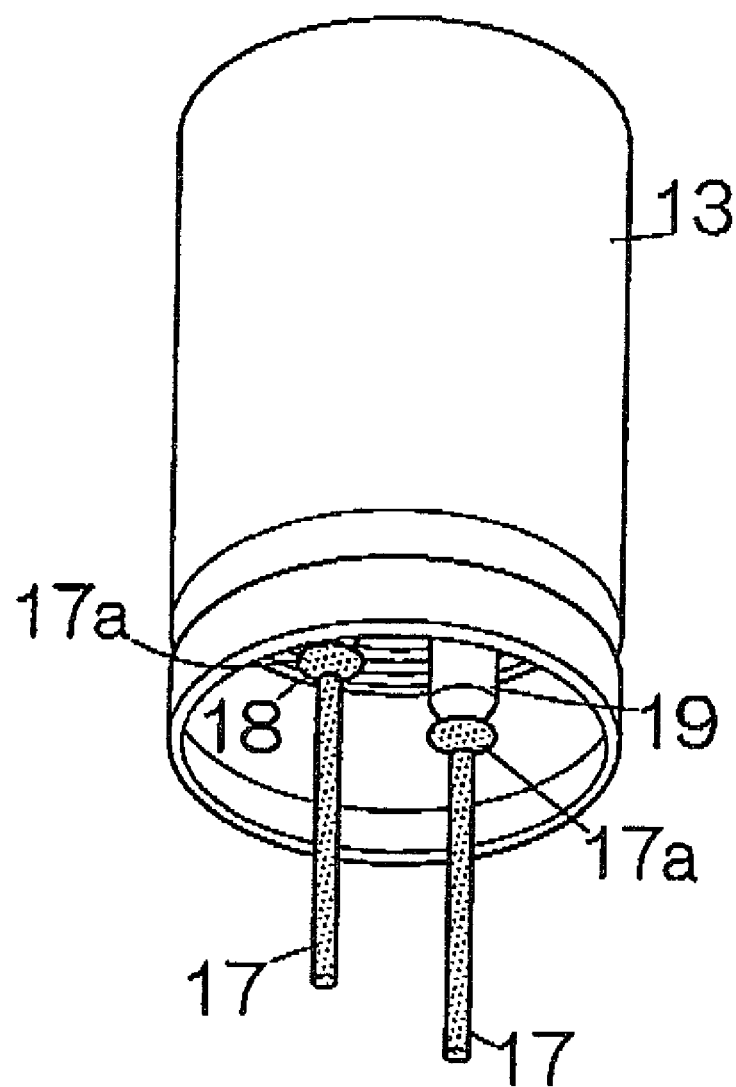
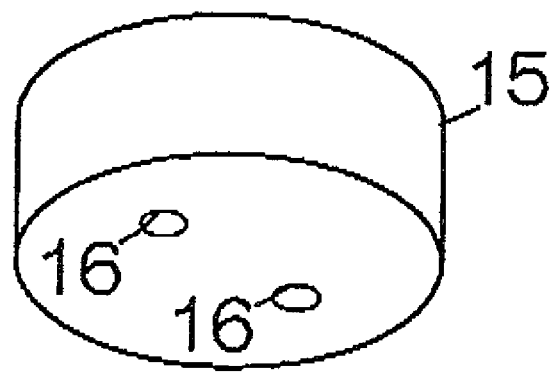

ELECTRONIC COMPONENT AND LEAD UNIT THEREFOR

BACKGROUND OF THE INVENTION

1. Field of the Invention

The present invention relates to an electronic component such as an electrolytic capacitor. In particular, the present invention relates to a lead unit incorporated in an electrolytic capacitor.

2. Description of the Prior Art

An electrolytic capacitor mounted on a printed wiring board is well known, for example. The electrolytic capacitor includes a capacitor element enclosed in a casing or sheathe. An electrically-conductive tab made of aluminum is attached to the capacitor element, for example. One end of a lead is bonded to the tip end of the electrically-conductive tab. The surface of the lead is coated with a tin plating film prior to the bonding of the lead to the electrically-conductive tab. The tin plating film allows enhancement of the wettability of a solder material. The lead is thus reliably bonded to the printed wiring board when the electrolytic capacitor is mounted on the printed wiring board.

A welding process is employed to bond the lead to the electrically-conductive tab. Stress is generated in the tin plating film at the welded area between the lead and the electrically-conductive tab. So-called whiskers are generated on the tin plating film. When whiskers fall onto the surface of the printed wiring board, a short circuit is caused in wiring patterns on the printed wiring board. It is thus required to reliably prevent the fall of the whiskers.

SUMMARY OF THE INVENTION

It is accordingly an object of the present invention to provide an electronic component capable of preventing whiskers from falling outward from a casing. It is also an object of the present invention to provide a lead unit for an electronic component, significantly contributing to realization of such an electronic component.

According to the present invention, there is provided an electronic component comprising: a casing; an electrically-conductive body placed in the inner space defined in the casing; a lead extending from the inner end to the outer end, the inner end welded to the electrically-conductive body, the outer end projecting outward out of the casing through a through hole formed in the casing; and an enlarged portion formed in the lead at a position between the inner end and the outer end, the enlarged portion set in the through hole to close the through hole.

The electronic component allows the outer end of the lead to protrude outward out of the casing through the through hole formed in the casing. The inner end of the lead is welded to the electrically-conductive body enclosed in the casing. The through hole of the casing is closed with the enlarged portion formed in the lead. Even if whiskers are generated at a position between the electrically-conductive body and the lead based on stress generated during a welding process, the whiskers are received on the enlarged portion in the through hole. No whisker falls out of the casing through the through hole. Even when the electronic component is mounted on a printed wiring board, no whisker falls onto the printed wiring board. This results in a reliable prevention of a short circuit caused by the whiskers on the printed wiring board.

The lead may be coated with a plating film at a position between the enlarged portion and the outer end in the electronic component. The lead is welded to the enlarged portion prior to the formation of the plating film. A plating process is then applied to the lead and the enlarged portion. The lead is in this manner coated with a plating film over an area between the enlarged portion and the outer end. Since the plating film is formed after the lead and the enlarged portion have been welded together, no stress is generated in the plating film. No whisker is thus generated in the lead at a position between the enlarged portion and the outer end. No whisker falls onto the outer space of the casing.

There may be provided a lead unit for an electronic component for realization of such an electronic component. The lead unit for an electronic component may comprise: an electrically-conductive tab; a spherical member having electric conductivity, the spherical member welded to the electrically-conductive tab; a lead having one end welded to the spherical member; and a plating film formed at least partly on the spherical member and the lead.

BRIEF DESCRIPTION OF THE DRAWINGS

The above and other objects, features and advantages of the present invention will become apparent from the following description of the preferred embodiment in conjunction with the accompanying drawings, wherein;

FIG. 8 is a perspective view schematically illustrating a packing pressed in a sleeve.

DESCRIPTION OF THE PREFERRED EMBODIMENT

Figure 1:
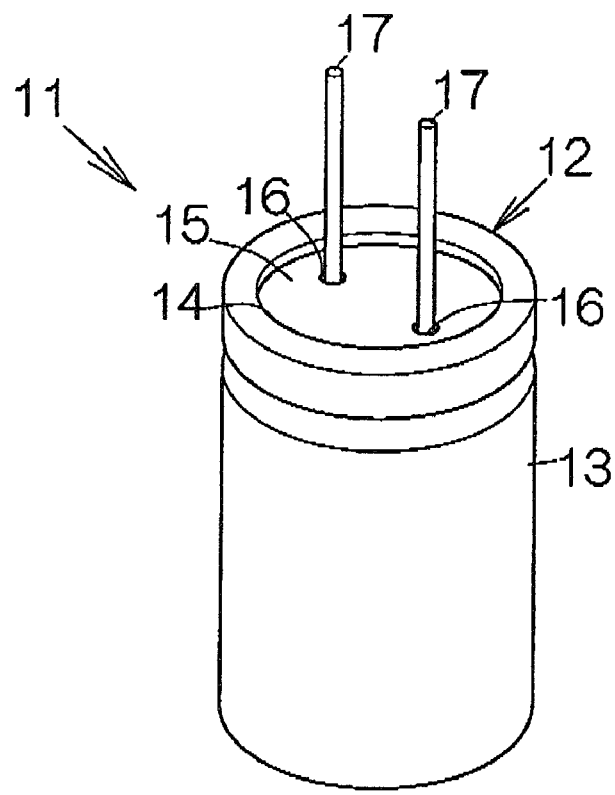
FIG. 1 is a perspective view schematically illustrating an electrolytic capacitor as a specific example of an electronic component according to the present invention.

FIG. 1 schematically illustrates an electrolytic capacitor 11 as a specific example of an electronic component according to the present invention. The electrolytic capacitor 11 includes a cylindrical casing or sheath 12, for example. The cylindrical casing 12 includes a cylindrical sleeve 13 and a packing 15 utilized to tightly close an opening 14 defined at one end of the sleeve 13. The sleeve 13 may include a sleeve body made of a metallic material such as aluminum and an overcoat, made of resin, utilized to coat the sleeve body, for example. The packing 15 is made of an elastic resin material such as robber, for example.

A pair of through holes 16, 16 is formed in the packing 15. The through holes 16 connect the inner space of the casing 12 to the outside space. The electrolytic capacitor 11 allows a lead 17 to protrude through the individual through hole 16. The lead 17 may include a body made of an electrically-conductive material such as copper, for example. A nickel film is formed to cover over the surface of the copper body. A plating process may be employed to coat the copper body, for example. The inner end of the lead 17 is bonded to an electrically-conductive body placed in the inner space of the casing 12, as described later in detail. A welding process is employed in this case. The outer end of the lead 17 protrudes outward from the casing 12.

Figure 2:
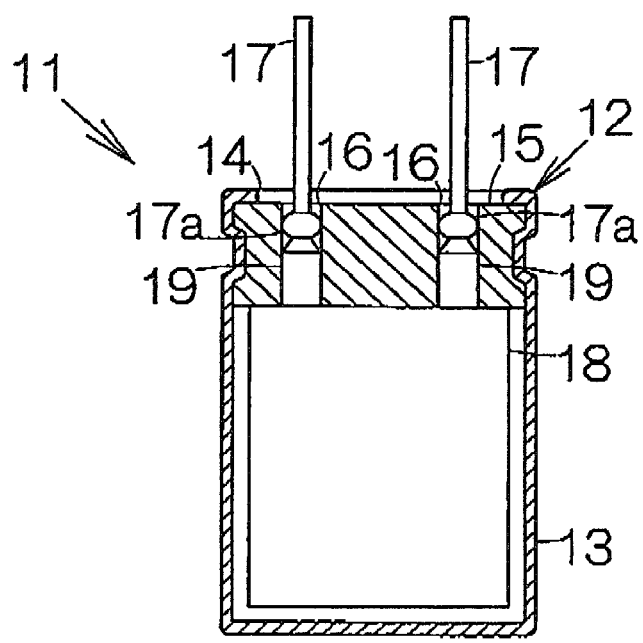
FIG. 2 is a sectional view schematically illustrating the electrolytic capacitor.

As shown in FIG. 2, an electrically-conductive body, namely a capacitor element 18, is enclosed in the casing 12. The capacitor element 18 is formed in a columnar shape. The capacitor element 18 includes a pair of electrically-conductive tabs 19, 19. The electrically-conductive tabs 19 protrude outward from one end of the capacitor element 18. The electrically-conductive tabs 19 may be made of a metallic material having electrical conductivity, such as aluminum, for example. Here, the electrically-conductive tabs 19 are received in the through holes 16, respectively.

An enlarged portion 17a is formed in the individual leads 17 at a position between the inner and outer ends of the lead 17. Here, the enlarged portion 17a is formed at the inner end of the lead 17. A welding process is employed to bond the enlarged portion 17a to the lead 17. The enlarged portion 17a may be made of a metallic material having electrical conductivity, such as copper, for example. The inner end, namely the enlarged portion, 17a of the lead 17 is bonded to one end of the electrically-conductive tab 19. A welding process is employed. The enlarged portion 17a serves to close the through hole 16.

The individual leads 17 are coated with a plating film, not shown, over an area between the enlarged portion 17a and the outer end of the lead 17. It should be noted that the enlarged portion 17a and the lead 17 may partly be coated with the plating film. The plating film may be made of tin, or a solder alloy consisting of tin and one of silver, copper and bismuth, for example. It should be noted that the lead 17, the enlarged portion 17a and the electrically-conductive tab 19 in combination serve as a lead unit for an electronic component, according to the present invention.

Figure 3:
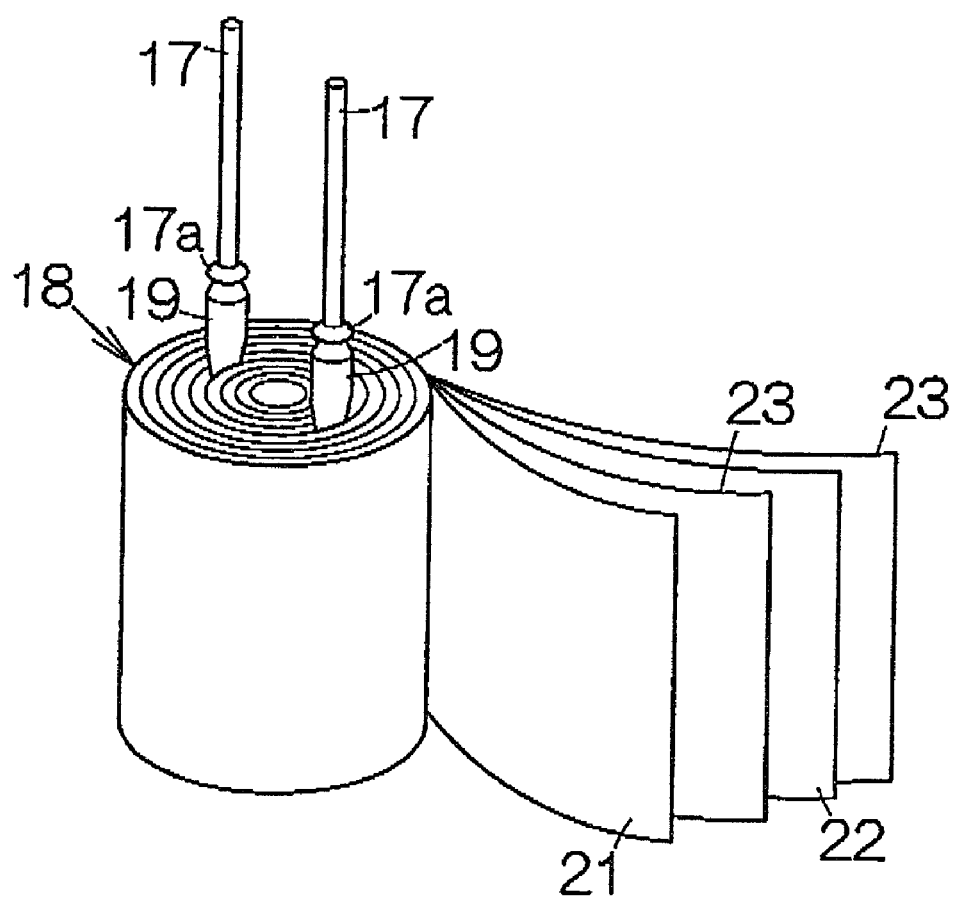
FIG. 3 is a perspective view schematically illustrating a capacitor element.

As shown in FIG. 3, a band-like anode foil 21 and a band-like cathode foil 22 are wound around the capacitor element 18 in a layered manner. Electrolysis papers 23 are layered on the anode and cathode foils 21, 22, respectively. The anode foil 21 and the cathode foil 22 are made of a metallic material having electrical conductivity, such as aluminum, for example. A dielectric body, namely an oxide film, is formed on the surface of the anode foil 21. An electrolyte solution is impregnated in the anode foil 21, the cathode foil 22 and the electrolysis paper 23.

One of the electrically-conductive tabs 19 is bonded to the anode foil 21. The other electrically-conductive tab 19 is bonded to the cathode foil 22. The individual electrically-conductive tab 19 defines a columnar portion at one end. The columnar portion is bonded to the enlarged portion 17a. The individual electrically-conductive tabs 19 also define a plate-shaped portion at the other end. The plate-shaped portion is coupled to the anode foil 21 or the cathode foil 22. The plate-shaped portion of the electrically-conductive tab 19 may be struck against the surface of the anode foil 21 or the cathode foil 22.

The electrolytic capacitor 11 is mounted on a printed wiring board, for example. The opening 14 of the sleeve 13 of the electrolytic capacitor 11 is opposed to the surface of the printed wiring board. The leads 17 extend toward the surface of the printed wiring board. A solder material is utilized to couple the leads 17 to electrically-conductive pads formed on the printed wiring board, for example. When voltage is applied to the electrolytic capacitor 11, the capacitor element 18 is electrically charged.

The individual through holes 16 are closed with the enlarged portion 17a of the lead 17 in the electrolytic capacitor 11. Even when whiskers are generated in a space between the electrically-conductive tab 19 and the enlarged portion 17a based on stress, caused by welding process for the enlarged portion 17a and the electrically-conductive tab 19, during the mounting of the electrolytic capacitor 11 onto the printed wiring board, the whiskers are received on the enlarged portion 17a. The whiskers are kept inside the through hole 16. The whiskers are reliably prevented from falling outward out of the casing 12. The printed wiring board is reliably prevented from receiving whiskers. This results in a reliable prevention of a short circuit in wiring patterns on the printed wiring board.

Figure 4:
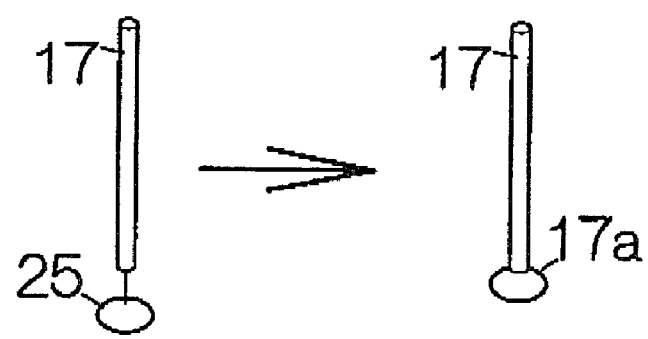
FIG. 4 is a perspective view schematically illustrating a spherical member attached to a lead.

Next, a brief description will be made on a method of making the electrolytic capacitor 11. The leads 17 are first prepared. As shown in FIG. 4, a spherical member 25 is bonded to the individual lead 17. A welding process is employed to bond the spherical member 25. The spherical member 25 may be made of an electrically-conductive material such as copper, for example. Here, the spherical member 25 may be bonded to one end of the lead 17. A welding bead may be utilized to bond the spherical member 25. The enlarged portion 17a is in this manner formed in the lead 17.

Figure 5:
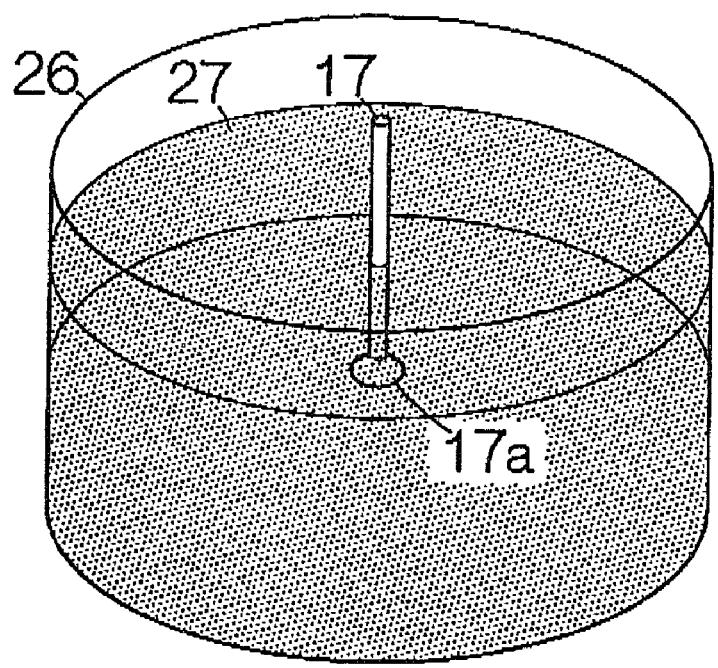
FIG. 5 is a perspective view schematically illustrating the lead soaked in a solder bath.

A plating process is then applied to the lead 17. As shown in FIG. 5, the lead is dipped in solder material 27 in a solder bath 26. The solder material 27 is kept in the fluid state. Here, the enlarged portion 17a of the lead 17 first enters the solder material 27. The lead 17 and the enlarged portion 17a are in this manner coated with a plating film. The plating film may be made of tin, or a solder alloy consisting of tin and one of silver, copper and bismuth. The solder material 27 contains no zinc.

Figure 6:
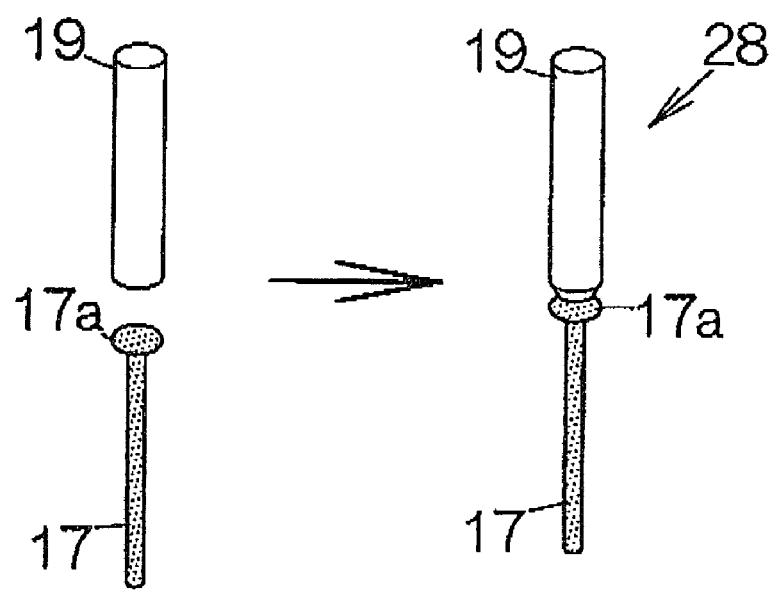
FIG. 6 is a perspective view schematically illustrating an electrically-conductive tab attached to the lead.

As shown in FIG. 6, the electrically-conductive tab 19 is bonded to the enlarged portion 17a after the formation of the plating film. A welding process may be employed to bond the electrically-conductive tab 19. The electrically-conductive tab 19 is formed in a columnar shape. The lead 17 is in this manner coupled to the electrically-conductive tab 19. A welding bead may be utilized to bond the electrically-conductive tab 19. The lead 17, the enlarged portion 17a and the electrically-conductive tab 19 are aligned on a straight line. A lead unit 28 for an electronic component is produced based on the combination of the lead 17, the enlarged portion 17a and the electrically-conductive tab 19.

Figure 7:
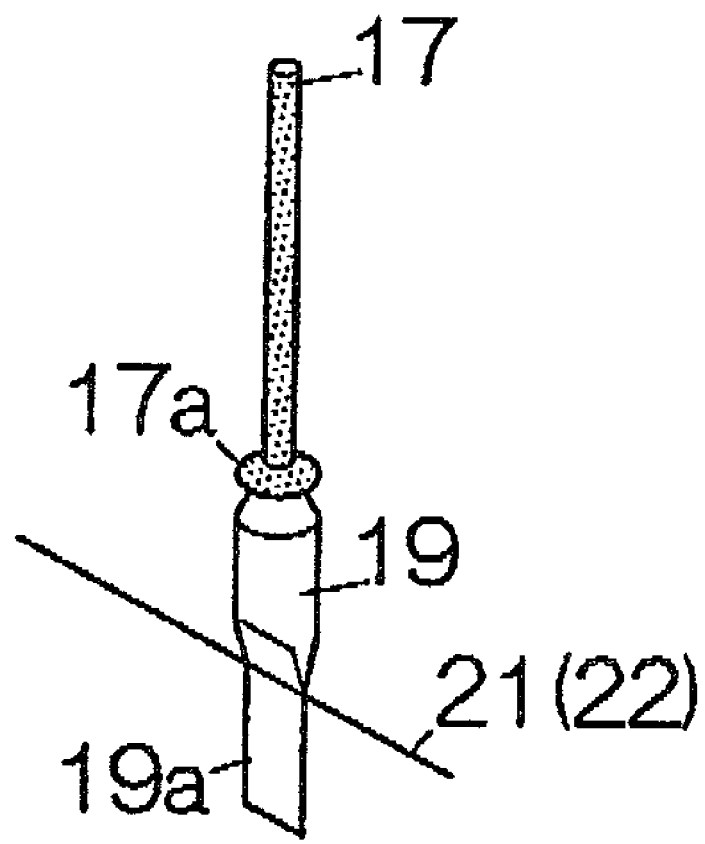
FIG. 7 is a perspective view schematically illustrating a lead unit attached to a anode foil or a cathode foil.

Next, the aforementioned capacitor element 18 is produced. A pair of lead units 28 is prepared. The electrically-conductive tabs 19 of the lead units 28 are coupled to the anode foil 21 and the cathode foil 22, respectively. As shown in FIG. 7, a plate-shaped portion 19a is formed at the other end of the individual electrically-conductive tab 19. The plate-shaped portion 19a of the electrically-conductive tab 19 is struck against the anode foil 21 or the cathode foil 22. The plate-shaped portion 19a is in this manner coupled to the anode foil 21 or the cathode foil 22. The anode foil 21, the cathode foil 22 and the electrolysis papers 23 are then wound together. The wound anode foil 21, the cathode foil 22 and the electrolysis papers 23 are dipped in an electrolysis solution.

The produced capacitor element 18 is inserted into the inner space defined in the sleeve 13. As shown in FIG. 8, one end of the sleeve 13 defines an opening larger then the aforementioned opening 14. The packing 15 is pressed into the sleeve 13. The lead 17, the enlarged portion 17a and the electrically-conductive tab 19 are received in the individual through holes 16 in this sequence. The through hole 16 is closed with the enlarged portion 17a. The inner space of the packing 15 is firmly closed. An edge is bent inward at one end of the sleeve 13 so that the diameter of the sleeve 13 gets reduced. The electrolytic capacitor 11 is in this manner produced.

A welding process is employed to bond the electrically-conductive spherical member 25 to the lead 17 to form the enlarged portion 17a. The lead 17 is then coated with a plating film over an area between the enlarged portion 17a and the outer end of the lead 17. A plating film is in this manner formed on the lead 17 and the spherical member 25 after the spherical member 25 has been bonded to the lead 17. Even when stress is generated based on a welding process to bond the lead 17 to the spherical member 25, such stress is prevented from acting on the plating film. No whisker is thus generated in the plating film.

Figure 9:
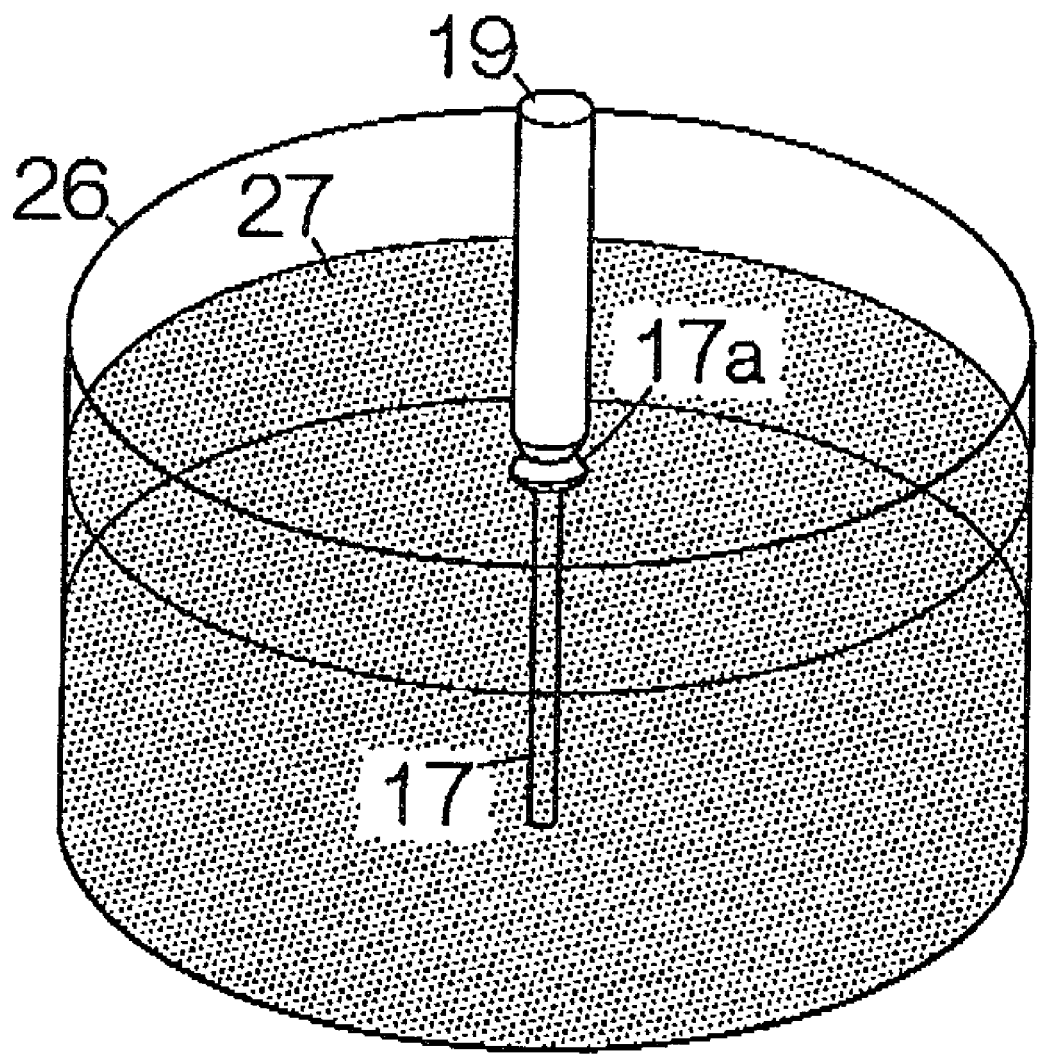
FIG. 9 is a perspective view schematically illustrating the lead unit soaked in the solder bath.

The electrically-conductive tab 19 may be bonded to the enlarged portion 17a based on a welding process prior to application of a plating process to the lead 17. The lead 17 is then dipped in the aforementioned solder material 27 in the solder bath 26, as shown in FIG. 9. The outer end of the lead 17 may first enter in the solder material 27. The lead 17 is in this manner coated with a plating film all over an area between the enlarged portion 17a and the outer end of the lead 17. The electrically-conductive tab 19 is prevented from a dip in the solder material 27 in the solder bath 26. No plating film is thus formed on the electrically-conductive tab 19.

The enlarged portion 17a may be made out of an electrically-conducive body formed in any shape other than the aforementioned spherical shape, such as a cone, a pyramid, a column, a prism, a truncated cone, or the like. The shape of the enlarged portion 17a may appropriately be selected depending on the shape of the section of the through hole 16 of the packing 15, the shape of the lead, and the shape of the electrically-conductive tab 19.

What is claimed is:

1. An electronic component comprising:
   a casing;
   an electrically-conductive body placed in an inner space defined in the casing;
   a lead extending from an inner end to an outer end, the inner end welded to the electrically-conductive body, the outer end projecting outward out of the casing through a through hole formed in the casing; and
   an enlarged portion formed in the lead at a position between the inner end and the outer end to close the through hole.

2. The electronic component according to claim 1, wherein the lead is coated with a plating film at a position between the enlarged portion and the outer end.

3. A lead unit for an electronic component, comprising:
   an electrically-conductive tab;
   a spherical member having electric conductivity, the spherical member welded to the electrically-conductive tab;
   a lead having one end welded to the spherical member; and
   a plating film formed at least on the spherical member and the lead.

* * * * *